US005597516A

United States Patent [19]

Feng et al.

[11] Patent Number: 5,597,516

[45] Date of Patent: Jan. 28, 1997

[54] PROCESS FOR IMMOBILIZING PLUTONIUM INTO VITREOUS CERAMIC WASTE FORMS

[75] Inventors: Xiangdong Feng; Robert E. Einziger, both of Richland, Wash.

[73] Assignee: Battelle Memorial Institute, Richland, Wash.

[21] Appl. No.: 514,308

[22] Filed: Aug. 11, 1995

[51] Int. Cl.$^{6}$ .......... C09K 3/00

[52] U.S. Cl. .......... 252/625; 588/11; 501/152; 501/155

[58] Field of Search .......... 588/11, 12, 252, 588/256; 501/152, 155; 252/625

[56] References Cited

U.S. PATENT DOCUMENTS

| | | | |
|---|---|---|---|
| 4,097,401 | 6/1978 | Guber et al. | 588/12 |
| 4,274,976 | 6/1981 | Ringwood | 588/15 |
| 4,329,248 | 5/1982 | Ringwood | 588/15 |

*Primary Examiner*—Ngoclan Mai

*Attorney, Agent, or Firm*—Douglas E. McKinley, Jr.

[57] ABSTRACT

Disclosed is a method for converting spent nuclear fuel and surplus plutonium into a vitreous ceramic final waste form wherein spent nuclear fuel is bound in a crystalline matrix which is in turn bound within glass.

3 Claims, No Drawings

PROCESS FOR IMMOBILIZING PLUTONIUM INTO VITREOUS CERAMIC WASTE FORMS

This invention was made with Government support under Contract DE-AC06-76RLO 1830 awarded by the U.S. Department of Energy. The Government has certain rights in the invention.

FIELD OF THE INVENTION

The present invention relates generally to a vitrification process or more specifically to a method for converting spent nuclear fuel and surplus plutonium into a vitreous ceramic final waste form.

BACKGROUND OF THE INVENTION

The production of nuclear power and atomic weapons has created stockpiles of plutonium, uranium and other radio-active wastes throughout the United States and the world. Following irradiation, a large and growing quantity of nuclear fuels have been permanently withdrawn from nuclear reactors. Constituent elements of these spent nuclear fuels have not been separated by processing. The inherent toxicity, chemical and physical properties of the wastes, and potential use of the wastes in the production of nuclear weapons, creates unique and stringent demands for safe and effective long term disposal of the wastes. To effectively address these unique concerns, a final waste form which meets the highest standards of safety, security and accountability is required.

Contrasted against these criteria, the disposal of these wastes to date has often been entirely unsatisfactory. The wastes have been stored in temporary sites, have leaked from a variety of containers into the ground, or have otherwise been introduced into the environment. The introduction of these wastes into the ground has created an unfortunate situation wherein the material contaminates the surrounding soil, thereby greatly increasing the waste volume. Also, once in the ground, wastes are subject to transport via environmental mechanisms and thus threaten human health and safety as well as spread further contamination. Thus, it is desirable that the wastes be processed from their present form to a form suitable for long term storage. To insure an acceptable long term solution to the problem, the final waste form must be resistant to environmental transport and degradation, including attack by chemical and physical processes.

Wastes are presently commingled with a wide variety other constituents including corroded fuel, sludge, concrete grit, metal fragments, fuel containers, sand, soil, and dirt. Effective long term storage and immobilization of the wastes requires either that the wastes be removed from the environment for processing or that the wastes and other constituents together are converted into an acceptable waste form in situ. To convert the wastes to an acceptable waste form requires either that the wastes be separated from the other constituents and processed separately, or that the wastes together with the other constituents be processed together.

The separation of wastes from the other constituents presents a variety of technical challenges. Due to the radioactivity and toxicity of the wastes, separation can be both hazardous and expensive. Thus, to provide satisfactory and economical final disposal of these wastes, it is desirable that the wastes be processed into a final form without the hazardous and expensive step of removing the other constituents. It is also desirable that the wastes in their final form prevent removal of the fissile constituents of the wastes and immobilize the wastes to prevent degradation and transport of the wastes by environmental mechanisms.

Several methods for providing a final form for waste are known in the art. Vitrification to produce borosilicate glasses having waste constituents bound within the glasses has been shown as an effective method for treatment of low volume, high level wastes. In the vitrification process, wastes are mixed with glass-forming additives and converted into an amorphous glassy form by high temperature melting and cooling. The drawbacks of vitrification include the requirement that fluxing components such as alkalis, boron, or alkaline earth metals, must be added to the waste. These fluxing components are necessary in quantities sufficient to achieve viscosity for processing at temperatures low enough for practical application of the vitrification process. A further drawback of vitrification arises due to the low solubility of many of the waste components of interest in glass which prohibits large concentrations of the waste components in the final glass form. This low solubility greatly increases the required volume of the final waste form for a given volume of radio-active waste components of interest.

A final form for waste may also be accomplished by the incorporation of waste components of interest into synroc. The synroc process produces a crystalline final waste form and involves the steps of mixing precursors (oxide, hydroxide or sol-gel) with the wastes, calcinating the mixture at a temperature of about 750° to 1100° C. for about 1 to 16 hours, adding Ti powders to the mixture, cold pressing the mixture at a pressure of about 40 to 345 mpa, and hot pressing the mixture at a pressure of about 15 to 50 mpa and a temperature of about 1150° to 1200° C. Drawbacks of the synroc process include restrictions of both the valence and the size of waste ions which may be incorporated into the lattice of the final crystal waste form. To insure the correct valence and size of the waste ions requires significant pretreatment of the waste. Also, high temperatures and pressures must be utilized to successfully create a suitable final waste form.

Thus, there exists a need for an economical method for creating an acceptable final waste form for spent nuclear fuel and surplus plutonium.

SUMMARY OF THE INVENTION

The present invention relates to a process wherein radioactive wastes and other contaminants are converted into a vitreous ceramic final waste form comprised of a stable crystalline phase, which contains metal oxides having low solubility in water, tightly bound to and embedded in a glass matrix. The process promotes the incorporation of metal oxides, including uranium, plutonium and other fission products, into the crystalline phase of the final waste form.

The process takes advantage of the phenomenon of crystal formation which occurs during normal commercial glass making. Normally, the formation of crystals is undesirable in glass making, as crystals occur as imperfections in the glass. The present invention, however, promotes the formation of crystals. Hazardous constituents, which have low solubility in glass, are bound into the crystal phase in the crystalline lattice. The crystal phase is in turn bound into the glass. By first binding the hazardous components in the crystal phase, it is possible to bind higher concentrations of the hazardous components into the glass phase than is possible when the hazardous components are bound directly into the glass matrix. This is due to the low solubility of the hazardous components in glass. For example, the solubility of plutonium in borosilicate glass would permit no more than 2% plutonium by weight to be bound in glass. By first binding the plutonium in crystals, as much as 15% plutonium by weight may be incorporated into the final waste form. The plutonium-bounded crystals provide addition proliferation barrier for plutonium since they are usually more difficult to dissolve in acid, bases, or other solvents than glasses.

A preferred embodiment of the process utilizes well known plasma centrifugal furnaces as melters. The relative concentrations of constituents placed in, and operation of, the melter is carefully controlled to insure selective crystalline formation as well as the formation of an acceptable final waste form.

Plasma melters known in the art are simply furnaces with rotating crucibles which rotate and heat material placed within them. Heating is accomplished by a plasma arc which is maintained across the material in the crucible. The plasma arc is maintained in a substantially fixed location as the material within the crucible is rotated through the arc. As the material is rotated through the arc, the arc creates a depression within the material, thereby mixing the material. The rotation of the crucible generates centrifugal force which also mixes the contents. Homogeneity of the contents is thus obtained by mixing the contents both with the rotation of the crucible and through the passage of the arc through the contents.

An advantage of the present invention is the ability to form acceptable final waste forms without pretreatment. Waste is placed into a plasma melter in substantially the same form as it exists in the environment. Thus, included with the spent nuclear fuel and surplus plutonium are a wide variety other constituents including corroded fuel, sludge, concrete grit, metal fragments, fuel containers, sand, soil, and dirt. The waste as it exists in the environment will contain all or part of the elements to form a specific crystal or crystals in a glass phase. Also, the mass of radionuclides and hazardous elements in the waste will determine stoichiometrically the amount of crystals which must be formed to bind the radionuclides and hazardous elements. Hazardous elements include, but are not limited to heavy metals, for example, Ni, Cr, Cd, Pb, Se, Bi, Cu, Zn, As and Hg. Elements which are missing from the waste are then provided to insure stoichiometric balance and their availability during crystal formation. Costs are minimized by using materials which may in themselves be waste products which contain the desired elements. The waste is then melted at a temperature between approximately 1000° to 1600° C., depending on the type of crystals which are to be formed.

After melting the waste, crystals are formed by allowing the waste to cool to a heat treating temperature between approximately 800° to 1250° C. for a period between approximately 1 to 48 hours. As with the initial melt, the temperature and duration of heat treating is dependant upon the specific crystals which are to be formed. The optimum temperatures are thus composition dependent. The optimum temperature is usually the temperature at which the waste is at a viscosity which allows the waste to be poured. However, vitreous ceramics can also be produced by melting the waste at temperatures at which the waste cannot be poured. At temperatures too low to allow the waste to be poured, the waste is sintered at that temperature.

The specific wastes placed in the melter will dictate the crystals which should be formed to produce an acceptable final waste form. For example, for oxides of uranium, plutonium, thorium, rare earth elements, and actinides, the formation of zirconolite crystals is preferred, as these constituents are most effectively bonded in a zirconolite crystal matrix. Perovskite-type crystals are preferred for wastes having rare earth elements, trivalent actinides, strontium, and cesium ions. Spinel types of crystals are preferred for cobalt, copper, iron, manganese, nickel, chromium, cadmium, and zinc ions. Pyroxene-structures are preferred for cesium, calcium, manganese, iron, chromium, aluminum, and silicon. Rutile and related phases are preferred for lead, titanium, tin, manganese, and tellurium. Phosphore related calcium and sodium phases are preferred for cesium, strontium, and rare earths. Neutron poisons such as Gd, Hf, and other rare earths can be incorporated in the lattice structure of crystals. Specific operating parameters are described in Table 1 below:

TABLE 1

| | Specific Operating Parameters | | |
|---|---|---|---|
| Crystal Type | Melt Temp., °C. | Heat Treat Temp., °C. | Heat Treat Time, hour |
| Zirconolite | 1200–1600 | 1000–1200 | 1–6 |
| Perovskite | 1200–1500 | 950–1050 | 1–6 |
| U—Ca-crystal | 1200–1500 | 950–1200 | 1–6 |
| Rutile | 1100–1300 | 900–1000 | 2–28 |
| Nephaline | 1100–1300 | 850–950 | 2–24 |
| Acmite | 1300–1400 | 800–900 | 2–24 |
| Hinonite | 1400–1550 | 1000–1200 | 2–24 |
| Baddeleyite | 1300–1600 | 1000–1300 | 2–24 |
| Fluorite | 1300–1550 | 1000–1300 | 2–24 |
| Spinel | 1200–1600 | 1000–1300 | 2–24 |

The crystals are thus formed are bound in a glass matrix enriched in network forming oxides such as silicon and aluminum and deficient in alkalis. The typical glass matrix composition will have between approximately 43 to 84 percent $SiO_2$ by weight, between approximately 3 to 25 percent $Al_2O_3$ by weight, between approximately 1 to 20 percent CaO by weight, up to approximately 24 percent $Fe_2O_3$ by weight, and less than 10 percent alkalis by weight. The glass matrix can be between approximately 10 to 90 percent of the final waste form by volume.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. A final waste form comprising:

a) radionuclide, hazardous element, or mixtures thereof in a crystalline phase b) said crystalline phase being bound in a glass phase consisting essentially of between 43% and 84% $SiO_2$, between 10% and 24% $Al_2O_3$, up to 24% $Fe_2O_3$, between 1% and 20% CaO, and less than 10% alkalis by weight.

2. The waste form of claim 1, wherein the crystalline phase is selected from the group consisting of zirconolite, perovskite, U-Ca-crystal, rutile, nephaline, acmite, hinonite, baddeleyite, fluorite, and spinel.

3. The waste form of claim 1, wherein the glass phase comprises between 10% and 90% of the waste form by weight.

* * * * *